(12) United States Patent
Furht et al.

(10) Patent No.: US 12,470,694 B2
(45) Date of Patent: *Nov. 11, 2025

(54) ONLINE AND OFFLINE SELECTION OF EXTENDED LONG TERM REFERENCE PICTURE RETENTION

(71) Applicant: OP Solutions, LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,704

(22) Filed: Oct. 17, 2023

(65) Prior Publication Data

US 2024/0048687 A1 Feb. 8, 2024

Related U.S. Application Data

(63) Continuation of application No. 17/387,037, filed on Jul. 28, 2021, now Pat. No. 11,825,075, which is a continuation of application No. PCT/US2020/015417, filed on Jan. 28, 2020.

(60) Provisional application No. 62/797,774, filed on Jan. 28, 2019, provisional application No. 62/797,805, filed on Jan. 28, 2019.

(51) Int. Cl.
*H04N 19/105* (2014.01)
*H04N 19/172* (2014.01)
*H04N 19/46* (2014.01)
*H04N 19/58* (2014.01)

(52) U.S. Cl.
CPC ......... *H04N 19/105* (2014.11); *H04N 19/172* (2014.11); *H04N 19/46* (2014.11); *H04N 19/58* (2014.11)

(58) Field of Classification Search
CPC ...... H04N 19/70; H04N 19/105; H04N 19/58; H04N 19/30; H04N 19/44; H04N 21/44004
See application file for complete search history.

(56) References Cited

U.S. PATENT DOCUMENTS

| | | | |
|---|---|---|---|
| 8,265,145 B1 * | 9/2012 | Pejhan | H04N 19/156 375/240.11 |
| 10,708,613 B2 * | 7/2020 | Samuelsson | H04N 19/70 |
| 2002/0092030 A1 * | 7/2002 | Gu | H04N 19/433 375/E7.257 |

(Continued)

*Primary Examiner* — Daniel Chang
(74) *Attorney, Agent, or Firm* — OP Solutions IP Department; Paul Ackerman (57) ABSTRACT

A video encoder encodes a plurality of pictures with one of the pictures being a long term reference picture. The encoder provides signaling in a bitstream for a decoder to reconstruct pictures by selectively activating the long term reference picture for use as a reference picture, maintaining the long term reference picture in the buffer while being inactive as a reference picture, changing the long term reference picture from inactive to active as a reference picture, and marking the long term reference picture as being unused for reference so that it is no longer eligible to be used as a reference picture for a subsequent picture and is removed as a reference picture.

7 Claims, 7 Drawing Sheets

(56) References Cited

U.S. PATENT DOCUMENTS

| | | | |
|---|---|---|---|
| 2006/0013318 A1* | 1/2006 | Webb | H04N 19/91 375/E7.279 |
| 2006/0159352 A1* | 7/2006 | Ishtiaq | H04N 19/00 375/E7.026 |
| 2008/0159636 A1* | 7/2008 | Maruyama | H04N 19/159 375/E7.267 |
| 2009/0052550 A1* | 2/2009 | Lamy-Bergot | H04N 19/31 375/E7.2 |
| 2009/0142043 A1* | 6/2009 | Fujinami | G11B 27/3036 386/241 |
| 2009/0169183 A1* | 7/2009 | Fujinami | G11B 27/329 386/E5.001 |
| 2009/0323801 A1* | 12/2009 | Imajou | H04N 19/105 382/232 |
| 2013/0235927 A1* | 9/2013 | Win | H04N 19/43 375/240.02 |
| 2013/0243081 A1* | 9/2013 | Chen | H04N 19/58 375/240.02 |
| 2013/0272398 A1* | 10/2013 | Deshpande | H04N 19/46 375/240.12 |
| 2014/0010281 A1* | 1/2014 | Rodriguez | H04N 21/440281 375/240.02 |
| 2014/0079119 A1* | 3/2014 | Samuelsson | H04N 19/423 375/240.12 |
| 2014/0086325 A1* | 3/2014 | Chen | H04N 19/58 375/240.14 |
| 2014/0086326 A1* | 3/2014 | Dziecielewski | H04N 21/4402 375/240.16 |
| 2014/0133556 A1* | 5/2014 | Chen | H04N 19/70 375/240.12 |
| 2014/0198857 A1* | 7/2014 | Deshpande | H04N 19/423 375/240.25 |
| 2014/0218473 A1* | 8/2014 | Hannuksela | H04N 19/30 348/43 |
| 2014/0301463 A1* | 10/2014 | Rusanovskyy | H04N 19/52 375/240.16 |
| 2015/0016500 A1* | 1/2015 | Seregin | H04N 19/61 375/240.02 |
| 2015/0016531 A1* | 1/2015 | Hannuksela | H04N 19/31 375/240.16 |
| 2015/0078456 A1* | 3/2015 | Hannuksela | H04N 19/42 375/240.01 |
| 2015/0103881 A1* | 4/2015 | Hendry | H04N 19/423 375/240.02 |
| 2015/0103927 A1* | 4/2015 | Hannuksela | H04N 19/159 375/240.26 |
| 2015/0156501 A1* | 6/2015 | Hannuksela | H04N 19/70 375/240.12 |
| 2015/0264370 A1* | 9/2015 | Ramasubramonian | H04N 19/423 375/240.02 |
| 2015/0271526 A1* | 9/2015 | Hendry | H04N 19/187 375/240.26 |
| 2015/0350660 A1* | 12/2015 | Choi | H04N 19/423 375/240.12 |
| 2016/0044324 A1* | 2/2016 | Deshpande | H04N 19/44 375/240.25 |
| 2016/0286219 A1* | 9/2016 | Rusanovskyy | H04N 19/182 |
| 2016/0381373 A1* | 12/2016 | Seregin | H04N 19/503 375/240.12 |
| 2017/0070739 A1* | 3/2017 | Lee | H04N 19/172 |
| 2017/0085890 A1* | 3/2017 | Choi | H04N 19/187 |
| 2017/0214938 A1* | 7/2017 | Zhang | H04N 19/177 |
| 2017/0302936 A1* | 10/2017 | Li | H04N 19/14 |
| 2018/0014010 A1* | 1/2018 | Dai | H04N 19/59 |
| 2021/0176489 A1* | 6/2021 | Hendry | A61C 7/002 |
| 2021/0258601 A1* | 8/2021 | Kim | H04N 19/54 |

\* cited by examiner

ONLINE AND OFFLINE SELECTION OF EXTENDED LONG TERM REFERENCE PICTURE RETENTION

CROSS-REFERENCE TO RELATED APPLICATIONS

This application is a continuation of co-pending U.S. application Ser. No. 17/387,037 filed on Jul. 28, 2021 and entitled "ONLINE AND OFFLINE SELECTION OF EXTENDED LONG TERM REFERENCE PICTURE RETENTION," which application is a continuation of International Patent Application Serial No. PCT/US20/15417, filed on Jan. 28, 2020, and titled "ONLINE AND OFFLINE SELECTION OF EXTENDED LONG TERM REFERENCE PICTURE RETENTION," which is incorporated by reference herein in its entirety. International Application Serial No. PCT/US20/15417 claims the benefit of priority of U.S. Provisional Patent Application Ser. No. 62/797,774, filed on Jan. 28, 2019, and titled "ONLINE SELECTION OF EXTENDED LONG TERM REFERENCE PICTURE RETENTION," which is incorporated by reference herein in its entirety, and of U.S. Provisional Patent Application Ser. No. 62/797,805, filed on Jan. 28, 2019, and titled "OFFLINE SELECTION OF EXTENDED LONG TERM REFERENCE PICTURE RETENTION," which is incorporated by reference herein in its entirety.

FIELD OF THE INVENTION

The present invention generally relates to the field of video compression. In particular, the present invention is directed to online and offline selection of extended long term reference picture retention.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC) and H.264) standard. Motion compensation can describe a picture in terms of the transformation of a reference picture to the current picture. The reference picture can be previous in time when compared to the current picture, from the future when compared to the current picture, or can include a long-term reference (LTR) frame. When images can be accurately synthesized from previously transmitted and/or stored images, compression efficiency can be improved.

Long term reference (LTR) frames have been used in video coding standards such as MPEG-2, H.264 (also referred to as AVC or MPEG-4 Part 10), and H.265 (also referred to as High Efficiency Video Coding (HEVC)). A frame marked as an LTR frame in the video bitstream is available for use as a reference until it is explicitly removed by bitstream signaling. LTR frames improve prediction and compression efficiency in scenes that have static background over an extended period (e.g., background in a video conference or video of parking lot surveillance). However, overtime, the background of a scene gradually changes (e.g., cars when parked in an empty spot become part of the background scene). Updating the LTR frame thus improves compression performance by allowing a better prediction.

Current standards such as H.264 and H.265 allow updating of LTR frames by signaling a newly decoded frame to be saved and made available as a reference frame. Such updates are signaled by the encoder and an entire frame is updated. But updating the entire frame can be costly. And when an LTR frame is updated, the prior LTR frame is discarded. If the static background associated with the prior and discarded LTR frame occurs again in the video (e.g., as in videos which switches from a first scene to a second scene, and then back to the first scene), the prior LTR frame must again be encoded in the bitstream, which reduces compression efficiency.

SUMMARY OF THE DISCLOSURE

In an aspect, an encoder includes circuitry configured to receive a video, determine a plurality of long-term reference frames, determine a long-term reference retention time, and encode the video into a bitstream including the determined plurality of long-term reference fames and the determined retention time.

In another aspect, a method includes receiving a video. The method includes determining a plurality of long-term reference frames. The method includes determining a long-term reference retention time. The method includes encoding the video into a bitstream, wherein encoding the video further comprises encoding the determined plurality of long-term reference fames and encoding the determined long term reference retention time.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference symbols in the various drawings indicate like elements.

DETAILED DESCRIPTION

Long-term reference picture (LTR) may be used for better prediction of video frames in the cases where certain portions of the frame become occluded then uncovered repeatedly over time. Traditionally, LTR is used over the duration of a scene or group-of-pictures, after which an LTR is replaced or discarded. Some implementations of the current subject matter may extend utility of LTR by selecting best candidate LTRs for retention in a reference list. In some implementations, explicitly signaled extended long-term reference (eLTR) frames may be retained in reference list for explicitly signaled lengths of time. Some implementations of current subject matter may provide significant compression efficiency gains compared to some existing approaches.

Figure 1:
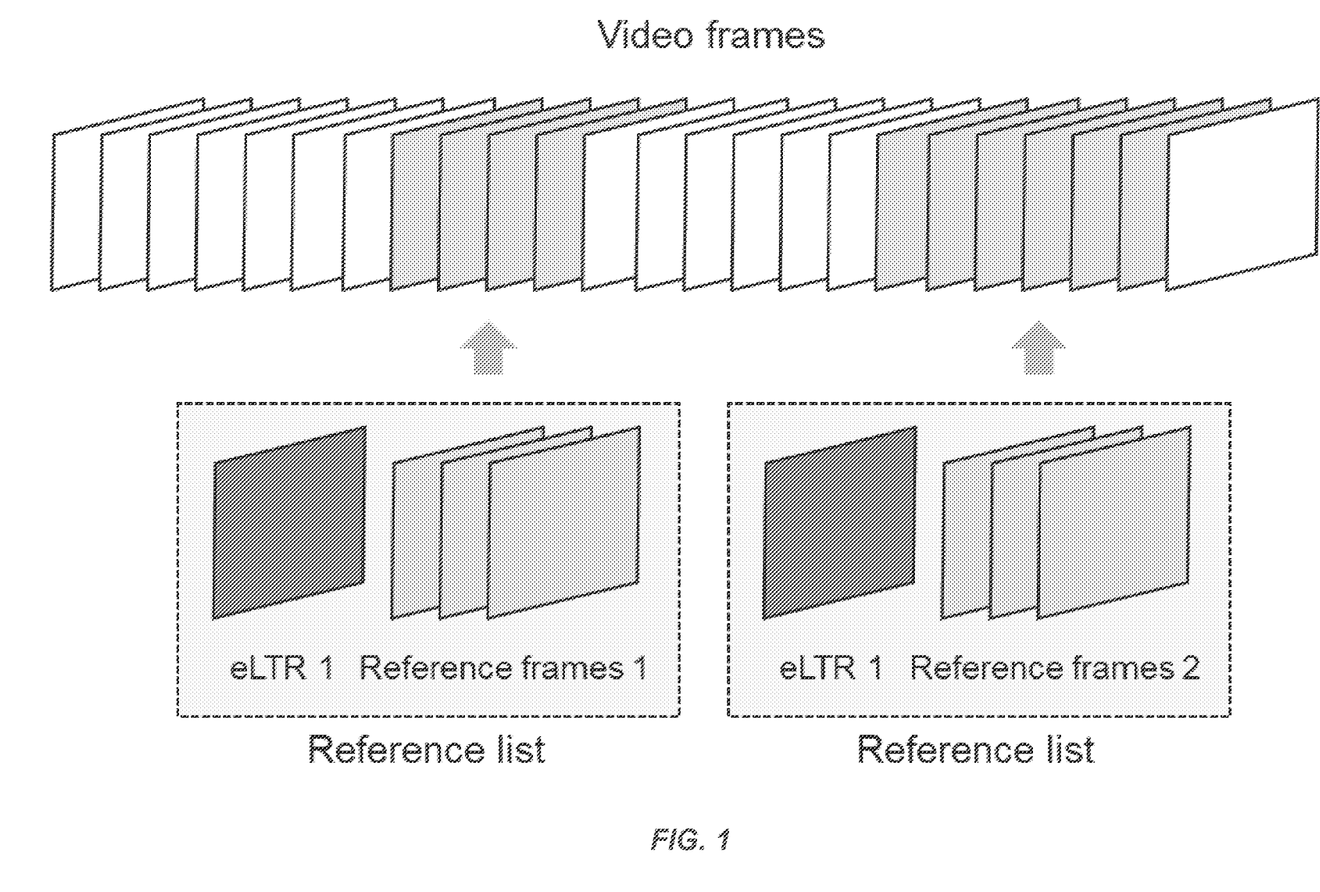
FIG. 1 illustrates an example reference list for frame prediction over a long period.

Some implementations of current subject matter may achieve selection and retention of an eLTR frame in video coding. The eLTR may be retained in a picture reference list, which may be used by the current frame or group of frames for prediction. While all other frames in the list may change over relatively short period, an eLTR may be retained in the reference list. For example, FIG. 1 illustrates the reference list for frame prediction over long period. In a non-limiting example, and as depicted in FIG. 1, video frames shown as shaded may be reconstructed using reference frames. Reference list can contain frames that change over time and an eLTR that is retained.

In some implementations, and continuing to refer to FIG. 1, an encoder may conduct operation of eLTR selection and retention calculation. Selected frames and time of retention may be signaled to a decoder, for example using pairs (eLTRn, TRn) indicating an index for the eLTR (eLTRn) and a retention time (TRn) for a frame n. Decoder may retain frame eLTRn for a period of TRn in reference list. After eLTRn frame has resided in reference list for at least TRn, eLTRn frame may be marked as unavailable for further use. In some implementations, eLTRn frame may be maintained in memory but in an unavailable state. In some implementations, an encoder may explicitly signal a decoder to mark an eLTRn frame as available or as unavailable. For example, an eLTRn frame previously marked as unavailable after passage of retention time TRn may be marked as available or vice-versa. Where an eLTRn frame is marked as unavailable, a decoder may cease using the eLTRn frame as a reference. Such feature may enable an eLTRn to be used again in the future, such as for video containing scenes that switch back and forth. In some implementations, an encoder may include a signal in a bitstream for a decoder to remove eLTRn frame from memory. Decoder may remove eLTRn frame from a reference list and memory based on such signal.

Still referring to FIG. 1 an eLTR frame may be selected by an encoder from a set of LTR frames that are composed using, for example, methods of block based LTR update. Once a set of LTR frames are composed. eLTR selection may be performed and retention may be determined.

With continued reference to FIG. 1, in an approach to eLTR selection and retention, referred to as an online method, processing may be performed in near real-time and may be advantageous for live and time sensitive scenarios. In this approach, LTR may be designated as eLTR and added to a reference list. Retention period may be initially set to TR. Expiration period TE may be set to current time plus retention period (T+TR). During retention, period usage of eLTR for frame prediction may be observed. If eLTR is referenced during this period, encoder may extent retention period. If eLTR is not used during this period, the eLTR may be removed from reference list and a pair (eLTR, TRtotal) as described above may be stored/signaled.

Still referring to FIG. 1, by adjusting TR, encoder may control a tradeoff between memory usage and compression efficiency. If same scenes in a video keep appearing over time, retention period may be set to a relatively high value and/or incremented upon detection of appearances. Detection of appearances may be performed, without limitation, using any process for detecting that a frame or group of pictures depict a given scene; in an embodiment, frames associated with a scene for which a given residual may be used may be identified by user input. Alternatively, a degree of similarity of a particular frame to a reference frame such as an eLTR may be measured and compared to a threshold value. A degree of similarity between a first frame and a second frame may be performed by comparing collocated pixels, defined for this purpose as pixels at matching coordinates. For instance, and without limitation, differences in values, such as without limitation luma and/or chroma values, at each pair of collocated pixels may be determined and aggregated through summation, averaging, or the like; a number representing aggregated differences may be compared to threshold value, where falling below the threshold value indicates that the first and second frames match. Alternatively or additionally, matching may be computed in the compressed domain, using values of most significant frequency coefficients (such as DC). Threshold value may be set arbitrarily, based on encoder parameters and available resources. In some implementations, an encoder may select between use of fixed TR values and variable TR values based on content of video, where selection may be made based upon available resources. Available resources include, without limitation, memory amount available to encoder and/or a decoder, memory bus speed available to encoder and/or a decoder, or the like; limited resources may imply shorter retention times, and less frequent updates of eLTR.

Figure 2:
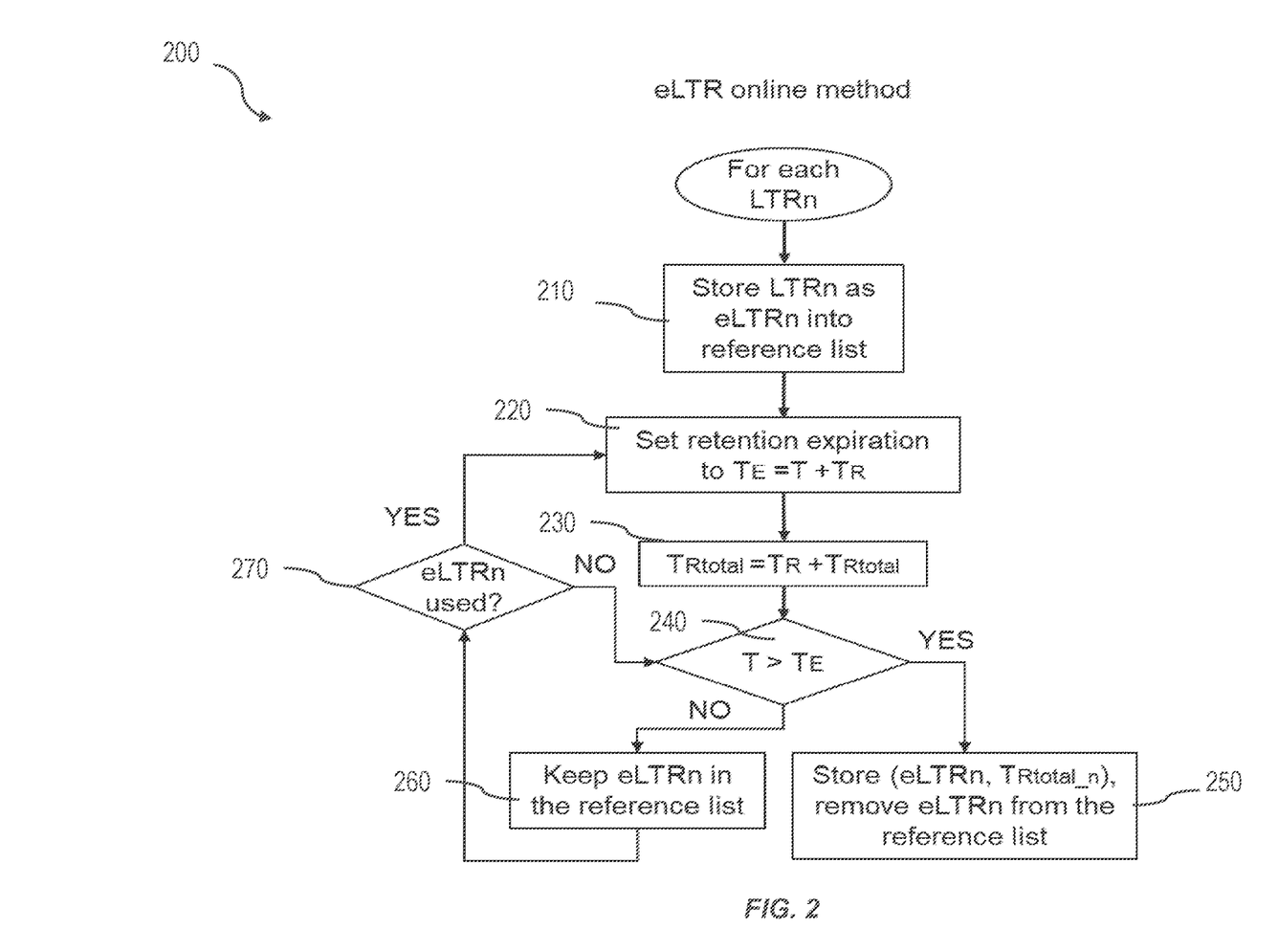
FIG. 2 is a process flow diagram illustrating an example process for an encoder to determine retention time for LTR frames that can reduce the number of bits used for compression of a video as compared to some existing approaches.

Referring to FIG. 2, a process flow diagram illustrates a non-limiting example of a process 200 for an encoder to determine retention time for LTR frames; in an embodiment, process 200 may reduce a number of bits used for compression of a video as compared to existing approaches. Example process 200 may be referred to in this disclosure as an online method. In an online method, a set of LTR frames utilized for encoding of a video may be determined. For each LTR frame in a set of LTR frames, online method may include, at step 210, storing a long-term reference frame (LTRn) into a reference list. At step 220, a retention expiration time may be set to a current time plus a retention time; retention time may be initialized to a period of time typically used. At step 230, a total retention time may be incremented by retention time. At step 240, whether current time exceeds a retention expiration time may be determined. At step 250, in response to determining that current time exceeds retention expiration time, an incremented total retention time may be stored. In addition, a first long-term reference frame may be removed from a reference list. At 260, in response to determining at step 240 that current time exceeds retention expiration time, a first long-term reference frame may be kept in a reference list. At 270, whether a first long-term reference frame is utilized to encode a video frame can be determined; if not, process 200 may return to 240 where, in response to determining that first long-term reference frame is not utilized to encode video frame, whether a second current time exceeds retention expiration time may be determined. If so, process 200 may return to 220 where, in response to determining that first long-term reference frame is utilized to encode video frame, retention expiration time may be set to current time plus retention time. Process 200 may repeat to determine a respective long term reference retention time for each frame of long-term reference frames. In following the above-described method, process may continue to increment total retention time in increments of retention time until eLTR frame is no longer being used to predict current frames, resulting in a total retention time that may be encoded in a bitstream to enable a decoder to use eLTR for a correct amount of time by decrementing total retention time. Increments to total retention time may be transmitted in bitstream to a decoder, such that decoder continues to retain eLTR as long as still usable.

Figure 3:
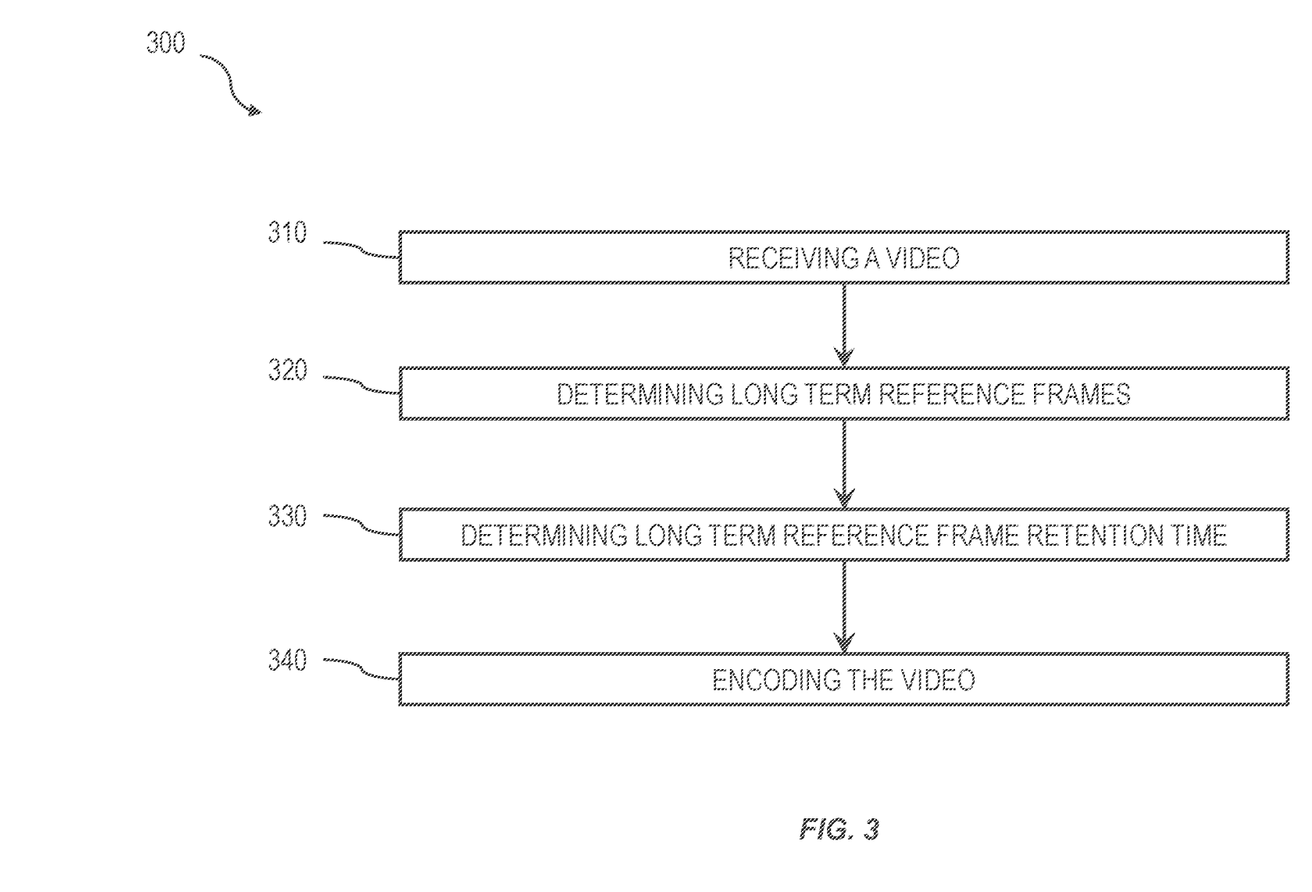
FIG. 3 is a process flow diagram illustrating an example process of extended long-term reference (eLTR) frame retention in which an eLTR frame is selected and retention is determined by the encoder.

FIG. 3 is a process flow diagram illustrating a non-limiting example of a process 300 of eLTR frame retention in which an eLTR frame is selected and retention is determined by encoder. Such eLTR retention may enable compression efficiency improvements compared to some existing approaches to video encoding and decoding.

At step 310, and still referring to FIG. 3, a video may be received by an encoder. At step 320, at least an LTR frame may be determined, for example, using block update LTR approaches.

At step 330, and still referring to FIG. 3, an LTR retention time may be determined, for example, using an online approach described above. Respective LTR retention times may be determined for each determined LTR frame.

At step 340, and still referring to FIG. 3, at least a portion of video may be encoded into a bitstream. Bitstream may include LTR frames and their respective determined retention times.

In another approach to eLTR selection and retention, which may be referred to for the purposes of this disclosure as an "offline" method, a long retention period may be predetermined; the retention period may be very long, such as up to the duration of a video. During this period eLTR may be stored in a secondary list such as without limitation in memory and/or on hard drive; selection of memory in which secondary list and/or eLTR is stored may depend on a frequency of referencing. After expiration of retention period, eLTR referencing may be analyzed and a final (e.g., optimal) value of TR may be selected. A signaling pair (eLTR, TRfinal) may be stored and/or signaled. Offline approach may find application for on-demand situations, for example, when a time constraint is not present.

In an offline approach, a decision on final TR value may be made based on a decoder memory profile and desired compression efficiency. Accordingly, the current subject matter may allow for flexibility in tradeoff considerations. Some implementations of the current subject matter may provide for improved efficiency, at the expense of slightly higher memory usage and processing time, as compared to some alternative approaches. Some implementations of the current subject matter may reduce a number of bits used for compression at a comparably small expense in memory usage, as compared to some existing approaches.

Figure 4:
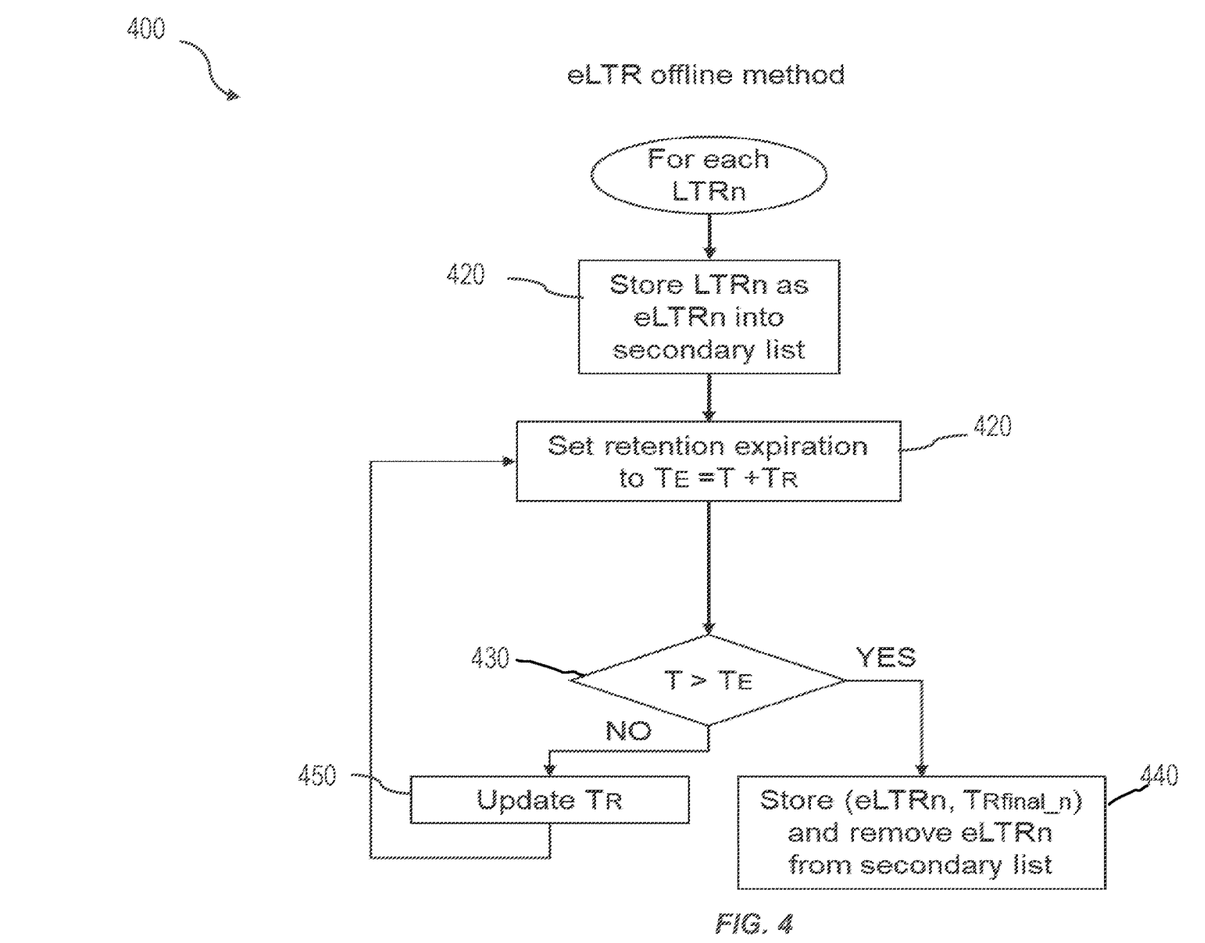
FIG. 4 is a process flow diagram illustrating an example process for an encoder to determine retention time for LTR frames that can reduce the number of bits used for compression of a video as compared to some existing approaches.

FIG. 4 is a process flow diagram illustrating an example process 400 for an encoder to determine retention time for LTR frames that may reduce the number of bits used for compression of a video as compared to some existing approaches. Example process 400 may be referred to as an offline method. In offline method, a set of LTR frames utilized for encoding of a video may be determined. For each LTR frame in set of LTR frames, offline method may include, at step 410, storing a long-term reference frame (LTRn) into a secondary list that is separate from a reference list.

At step 420, and still referring to FIG. 4, a retention expiration time may be set to a current time plus a retention time; retention time may be determined, without limitation, as described above in reference to FIGS. 1-3. At step 430, whether a current time exceeds retention expiration time may be determined. At step 440 in response to determining that current time exceeds retention expiration time, a final total retention time may be stored. In addition, a first long-term reference frame may be removed from the secondary list upon determination of final total retention time. Final total retention time may be determined, without limitation, upon encoding an entire video, or upon another event occurring indicative that eLTR will not be used in further predictions.

At 450, retention time may be updated in response to determining that current time does not exceed retention expiration time. Process 400 may return to 420 where retention expiration time may be set to current time plus the retention time. Process 400 may repeat to determine a respective long term reference retention time for each of one or more long term reference frames. As a result, each of one or more long term reference frames may be stored in secondary list with a variable indicating a currently calculated total retention time, which may be incremented until completion of process 400; as a result, a listing of long-term reference frames and corresponding total retention times may be stored in memory of encoder and/or transmitted to a decoder. Decoder may use total retention time for a given long term reference frame to determine whether that long term reference frame may be discarded; determination may be performed, without limitation, by decrementing total reference time and/or comparing it to a counter.

Figure 5:
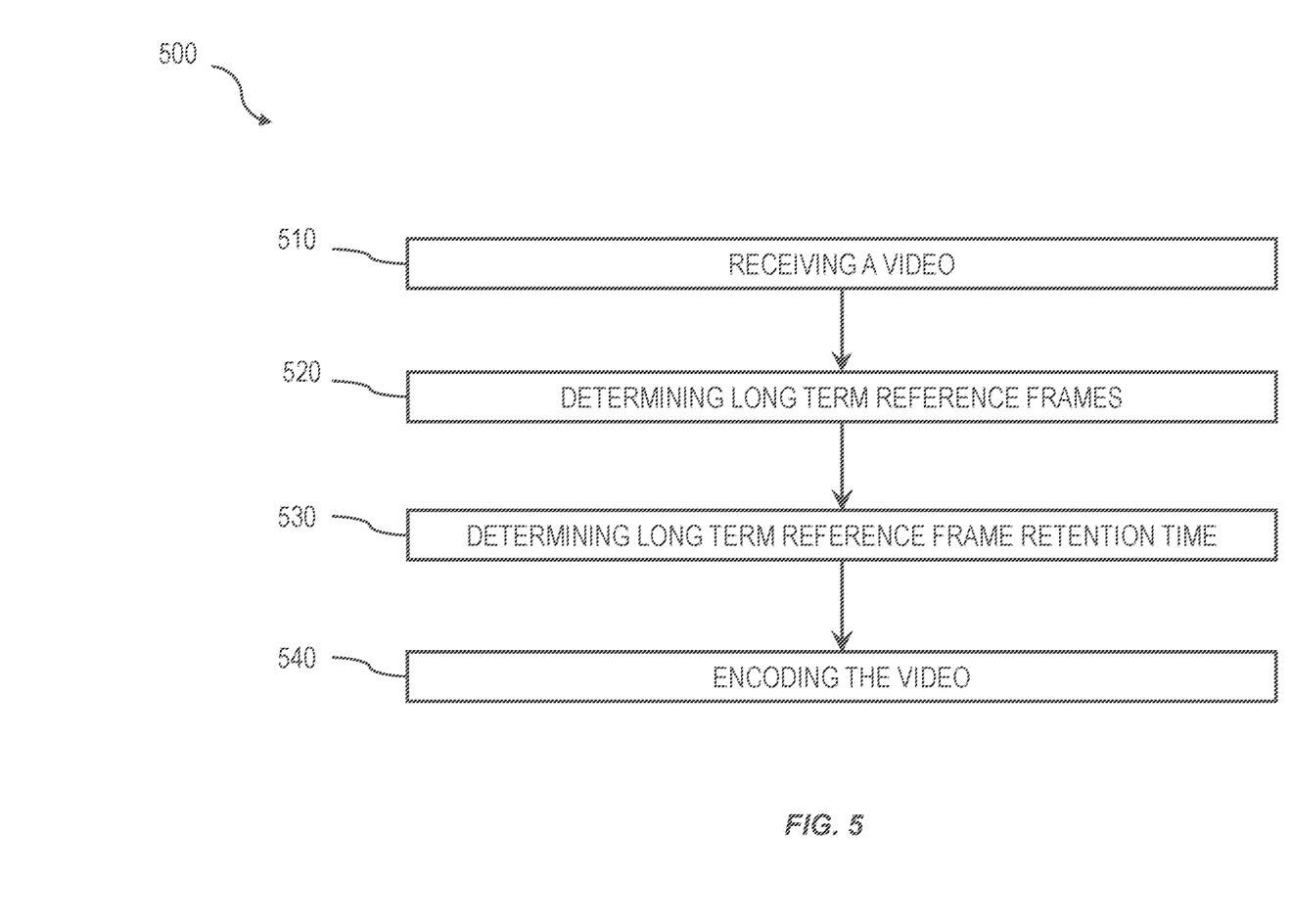
FIG. 5 is a process flow diagram illustrating an example process of extended long-term reference (eLTR) frame retention in which an eLTR frame is selected and retention is determined by the encoder.

FIG. 5 is a process flow diagram illustrating a non-limiting example of a process 500 of eLTR frame retention in which an eLTR frame is selected and retention is determined by an encoder. Such eLTR retention may enable compression efficiency improvements compared to some existing approaches to video encoding and decoding.

At step 510, and still referring to FIG. 5, a video may be received by an encoder. At step 520, LTR frames may be determined, for example, using block update LTR approaches. At step 530, an LTR retention time may be determined, for example, using the offline approach described above and with respect to FIG. 4. Respective LTR retention times may be determined for each determined LTR frame. At step 540, at least a portion of the video may be encoded into a bitstream. Bitstream may include LTR frames and their respective determined retention times.

Figure 6:
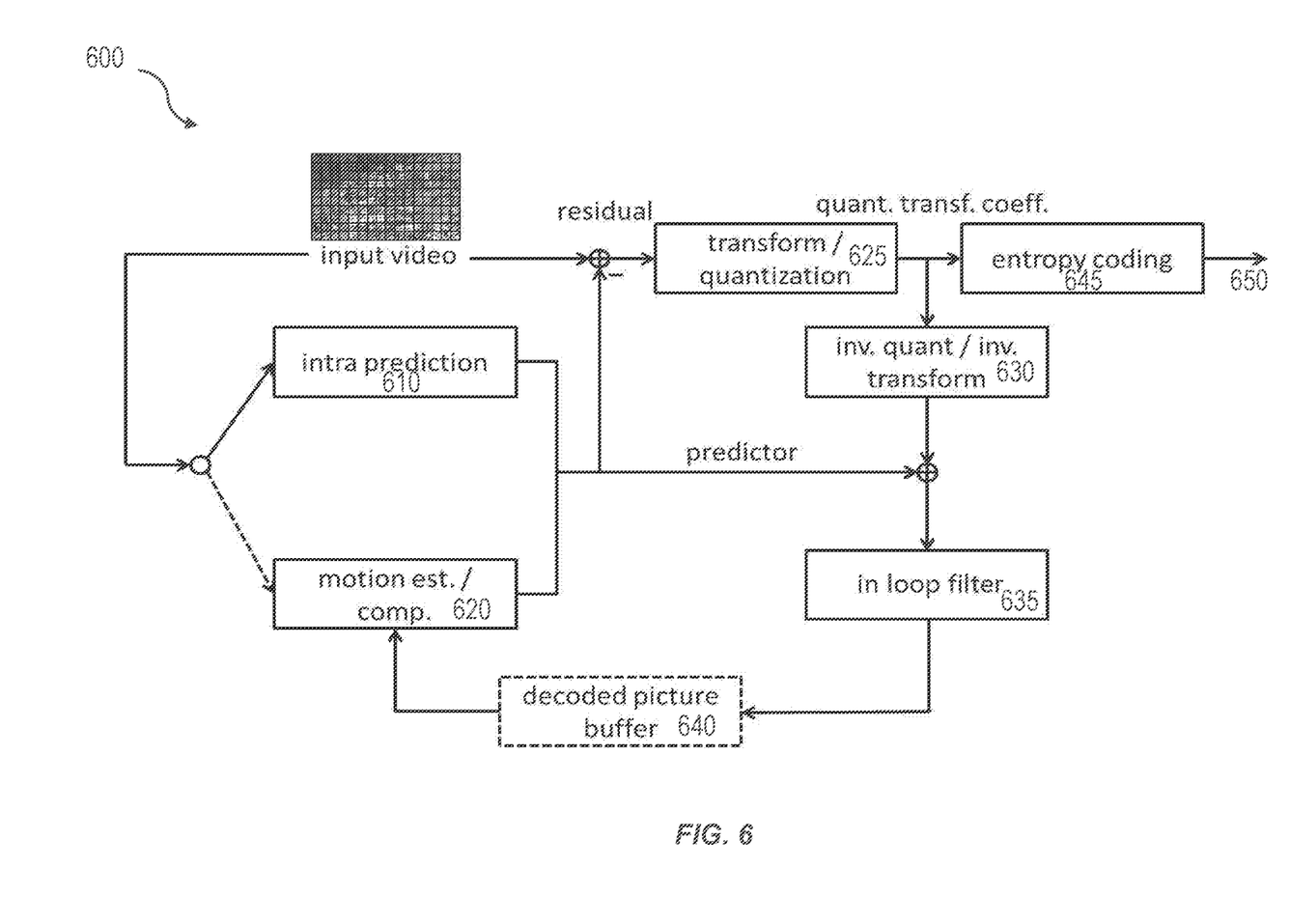
FIG. 6 is a system block diagram illustrating an example video encoder 600 capable of selecting long term reference (LTR) frames and determining retention time.

FIG. 6 is a system block diagram illustrating a non-limiting example video encoder 600 capable of selecting LTR frames and determining retention time. Video encoder 600 may receive an input video 605, which may be initially segmented or divided according to a processing scheme, such as a tree-structured coding block partitioning scheme; as a non-limiting example, block partitioning scheme may include partitioning using a quad-tree plus binary tree. An example of a tree-structured coding block partitioning scheme may include partitioning a picture frame into large block elements called coding tree units (CTU). In some implementations, each CTU may be further partitioned one or more times into a number of sub-blocks called coding units (CU). A result of this portioning may include a group of sub-blocks that can be called predictive units (PU). Transform units (TU) may also be utilized.

Still referring to FIG. 6, video encoder 600 may include an intra prediction processor 615, a motion estimation/compensation processor 620 (also referred to as an inter prediction processor) capable of supporting eLTR frame retention, a transform/quantization processor 625, an inverse quantization/inverse transform processor 630, an in-loop filter 635, a decoded picture buffer 640, and an entropy coding processor 645. In some implementations, motion estimation/compensation processor 620 may determine eLTR retention times and/or additional signaling parameters. Bitstream parameters that signal eLTR frame retention and/or additional parameters may be input to entropy coding processor 645 for inclusion in an output bitstream 650.

In operation, for each block of a frame of the input video 605, whether to process the block via intra picture prediction or using motion estimation/compensation may be determined. Block may be provided to intra prediction processor 610 or motion estimation/compensation processor 620. If block is to be processed via intra prediction, intra prediction processor 610 may perform processing to output a predictor. If block is to be processed via motion estimation/compensation, a motion estimation/compensation processor 620 may perform processing including using eLTR frames as a reference for inter prediction, if applicable.

With continued reference to FIG. 6, a residual may be formed by subtracting predictor from input video. Residual may be received by transform/quantization processor 625, which may perform transformation processing (e.g., discrete cosine transform (DCT)) to produce coefficients, which may be quantized. Quantized coefficients and any associated signaling information may be provided to entropy coding processor 645 for entropy encoding and inclusion in output bitstream 650. Entropy encoding processor 645 may support encoding of signaling information related to eLTR frame retention. In addition, quantized coefficients may be provided to inverse quantization/inverse transformation processor 630, which may reproduce pixels, which may be combined with predictor and processed by in loop filter 635, an output of which may be stored in a decoded picture buffer 640 for use by a motion estimation/compensation processor 620 that is capable of supporting eLTR frame retention.

Still referring to FIG. 6, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and continuing to refer to FIG. 6, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at Coding Unit level, a joint-classifier decision tree structure may eliminate unnecessary iterations and control risk of false prediction.

The subject matter described herein may provide many technical advantages. For example, some implementations of the current subject matter may provide for encoding video frames using an eLTR frame retained in a reference list. Such approaches may improve compression efficiency. Furthermore, eLTR utilization may improve error-resilience for video transmitted over noisy networks, for example, as a result of the reference frame being already transmitted and stored for a longer period.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
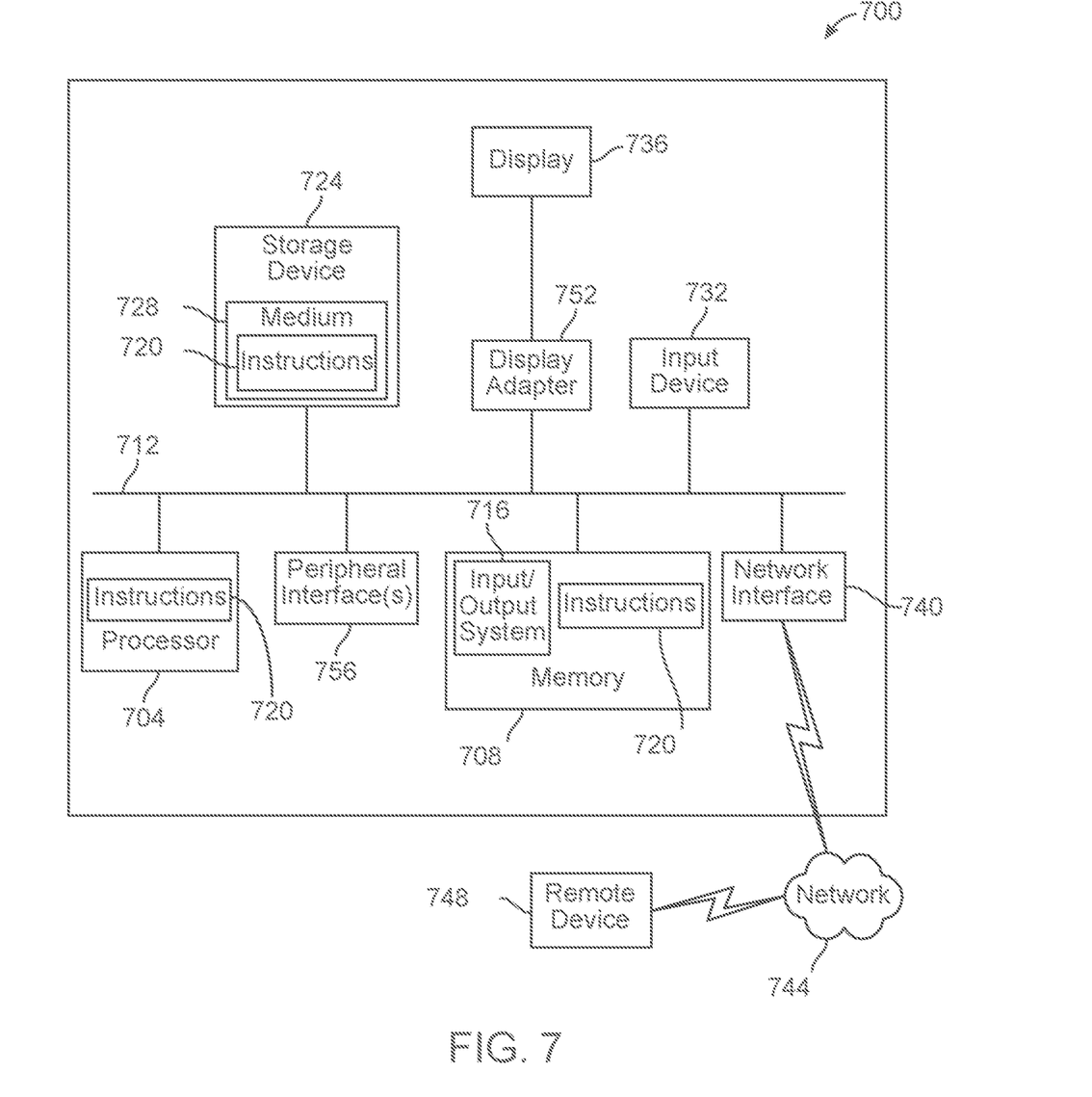
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A video encoder for generating an encoded bitstream with signaling for a decoder, the encoder comprising:
   a motion compensation processor;
   an inverse quantizer and inverse transformer, wherein a plurality of pictures being reconstructed by using the inverse transformer and inverse quantizer to inverse transform and inverse quantize residual signals, and adding the residual signals to predictors generated by the motion compensation processor, the plurality of reconstructed pictures including first, second, and third reconstructed pictures; and
   a buffer for storing the reconstructed pictures including the first, second and third pictures,
   wherein the reconstructing comprises:
      reconstructing the first picture by determining a first list of active reference pictures from the pictures in the buffer, one of the active reference pictures being a long term reference picture, and reconstructing a block of said first picture using a predictor from the long term reference picture;
      reconstructing the second picture by determining a second list of active reference pictures from the pictures in the buffer, said second list not including the long term reference picture and, in response to at least one parameter generated by an encoder, determining that the long term reference picture has a status where it is inactive as a reference picture for the second picture while continuing to be stored in the buffer and eligible to be an active reference picture for a third picture; and
      reconstructing the third picture by determining a third list of active reference pictures from the pictures in the buffer including, in response to at least one parameter generated by an encoder, changing the determination of the long term reference picture from inactive to active as a reference picture, and including the long term reference picture in the third list, and reconstructing a block from the third picture using a predictor from the long term reference picture,
      the long term reference picture then being marked as unused for reference so that it is not eligible to be used as a reference picture for a subsequent picture and is removed from the buffer.

2. The encoder of claim 1, wherein the plurality of pictures are single view pictures.

3. The encoder of claim 1, wherein the long term reference picture is removed from the buffer when an increasing counting parameter reaches a predetermined value.

4. The encoder of claim 3, wherein the increasing counting parameter is a time related parameter.

5. A method of video signal processing comprising:
   reconstructing a plurality of pictures, the plurality of reconstructed pictures including first, second, and third reconstructed pictures; and
   storing the first, second and third reconstructed pictures, wherein the reconstructing a plurality of pictures comprises:
      reconstructing the first picture by determining a first list of active reference pictures, one of the active reference pictures being a long term reference picture, and reconstructing a block of said first picture using a predictor from the long term reference picture;
      reconstructing the second picture by determining a second list of active reference pictures, said second list not including the long term reference picture and, in response to at least one parameter generated by an encoder, determining that the long term reference picture has a status where it is inactive as a reference picture for the second picture while continuing to be stored and eligible to be an active reference picture for a third picture; and reconstructing the third picture by determining a third list of active reference pictures, in response to at least one parameter generated by an encoder changing the determination of the long term reference picture from inactive to active as a reference picture, and including the long term reference picture in the third list, and reconstructing a block from the third picture using a predictor from the long term reference picture; and the long term reference picture then being marked as unused for reference so that it is ineligible to be used as a reference picture for a subsequent picture and is removed from storage.

6. The encoder of claim 5, wherein the long term reference picture is removed from the buffer when an increasing counting parameter reaches a predetermined value.

7. The encoder of claim 6, wherein the increasing counting parameter is a time related parameter.

* * * * *